United States Patent Office 3,465,772
Patented Sept. 9, 1969

3,465,772
FLUID AMPLIFIER SYSTEM
Michele Monge and Angelo Abbate Daga, Turin, Italy,
assignors, by mesne assignments, to I-T-E Imperial Corporation, Philadelphia, Pa.
Filed Oct. 10, 1966, Ser. No. 585,604
Claims priority, application Italy, Nov. 3, 1965,
24,673/65
Int. Cl. F15c 1/06
U.S. Cl. 137—81.5                                22 Claims

ABSTRACT OF THE DISCLOSURE

A fluid amplifier system comprising a plurality of planar fluidic components each having fluid inlet and outlet fittings with an elongated supporting member for the components along with releasable snap holding connections between each component and the supporting member, and a pressure fluid manifold carried by the supporting member and including a main conduit connected at one end with a fluid pressure source and provided along its length with branches connected with the fluid inlet fittings of the fluidic components, and independent means for adjusting the fluid pressure in the branch conduits.

---

The invention relates to a fluid system comprising a plurality of fluid amplifiers functioning for instance as analog components, logic components, passive components, components adapted to provide recordable bias, components adapted to provide dimension measuring circuits and the like, and interconnected with one another to provide circuits adapted to perform computing, control, adjustment, alarm functions and the like.

In the field of fluid amplification various interconnecting means are known which allow cascade connection of a plurality of elements or establish suitable interconnections of a plurality of components. Such means are generally in the form of connecting pipes provided with suitable fittings of various kind by which all necessary branches can be obtained from one interconnecting line. This arrangement, which is the most obvious, as well as generally the quickest and cheapest, is, however, of little practical value for the assembly of fluid components in industrial plants. This is due mainly to difficulties experienced in establishing and maintaining circuit connectons and to the considerable clumsiness of most known connection arrangements.

Moreover, the indiscriminate use of pipings and fittings introduces into the circuitry distributed resistances and capacitances which, unless they have been allowed for during design of the system, are apt to adversely affect of the whole circuit.

In the fluid amplification field a constructional technique is generally employed which is similar to the technique of electronic printed circuit arrangement. According to this technique the circuit of a given component is engraved on a single plate with its respective connections, thereby forming a circuit of the so-called integrated type. Such circuits afford for fluid amplification the advantage of being free from external connections and are usually in the form of a single plate on which the entire printed circuit is provided, the plate merely having connections for feeding and delivering the working fluid.

Such integrated circuits are not always, however, so easily constructed in practice as in theory owing to the problems of coupling the outlets from one element with the inlets of another.

According to other techniques the interconnections of the fluid components are formed on a single plate in a manner strictly similar to that of electrical printed circuits, the elements being plugged into the cover of the said plate in a manner similar to the assembly of thermionic valves in their respective sockets.

However, such arrangements are objectionable owing to the unflexible nature of the system which excludes the use of components other than those specifically intended; moreover, as in the case of integrated printed circuits, if one component ceases to function correctly for any reason, a repair cannot be carried out merely by replacing the inefficient unit or component, and the whole circuit has to be replaced.

An object of the present invention is to obviate the above drawbacks by the provision of a readily disassembled arrangement which is adapted to provide a system of fluid circuits including a plurality of interconnected fluid amplifiers, by which any logic or analog fluid circuit can be quickly, simply and easily assembled with a minimum overall size.

A further object of the invention is to provide an arrangement of the type referred to above, in which one or a plurality of circuit components can be interchanged or replaced without the need for any modification of the remaining circuit, this being achieved by the use of readily fitted modular elements fed from a common pressure source.

Another object of the invention is to provide an arrangement of the type referred to above, in which the same basic components can be utilized for providing any other circuit simply by varying their mutual connections.

Yet another object of the invention is to provide an arrangement of the type referred to above, wherein the various fluid amplifier components are of a geometrical shape such that interchangeability of the components and consequent maximum flexibility of the system are afforded.

Another and more general object of the invention is to provide a fluid system of the type referred to above, which is specially designed for assembly in panel form and in industrial plants.

According to these and other objects there is provided a fluid amplifier system comprising a plurality of box-shaped modular components each including a fluid amplifier with fluid inlet and outlet fittings and having a total thickness equal to or a multiple of a basic unit value, an elongated supporting member for the said components, retaining means for releasably snap-holding each component in an assembled condition with respect to said support and a pressure fluid manifold carried by the said support and including a conduit connected at one end with a pressure fluid source and provided at regions along its length with branches each adapted to engage and connect with a fitting of a said component on assembly thereof in the support so as to establish a fluid connection between the conduit and the components, means being provided on the manifold for adjusting the fluid flow and so controlling the fluid pressure feed to the components and means being provided on the components for indicating the pressure at which they are fed.

These and other objects and advantages of the invention will be clear from the following description given with reference to the accompanying drawings, which are by way of example and in which.

It is to be noted that in some of the figures the sectioning is not wholly "true" and in some cases a degree of shadings perspective or breaking-away has been adopted in the interests of clarity.

Figures 1, 2:
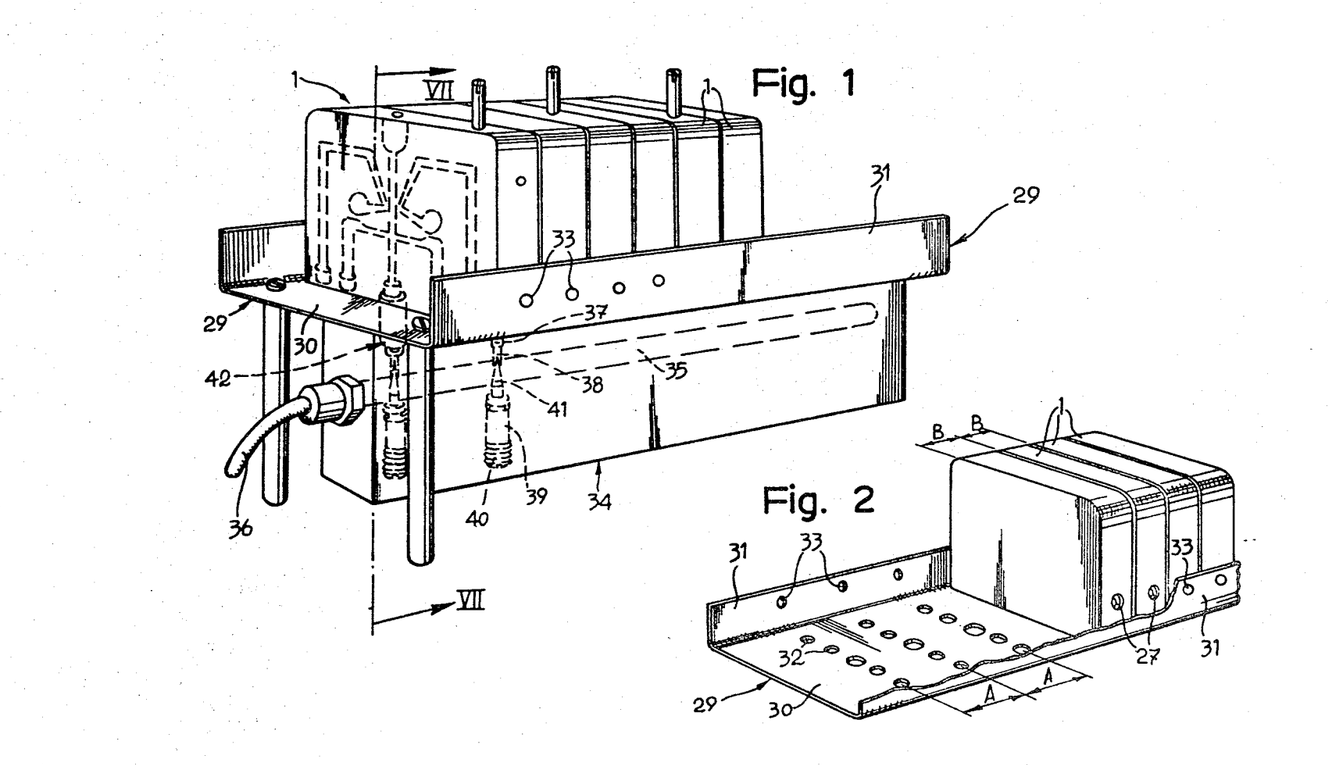
FIG. 1 is a perspective view of a system for providing a complex of fluid circuits according to the invention, the system being shown in an assembled condition.
FIG. 2 is a perspective view of the system of FIG. 1 in a partly assembled condition.

As will be seen from FIG. 1, the system providing a complex of fluid circuits according to the invention consists of a plurality of fluid amplifier modular components generally denoted 1. These components are of flat box-like shape and are all of a thickness which is the same as or a multiple of, a predetermined unit value, denoted B in FIG. 2.

Each component is equipped with a plurality of fluid inlet and outlet fittings 6, 7, all arranged on one of the smaller or side wall faces of the box and situated substantially on a common plane parallel to the major faces of the box and spaced therefrom the same distance in all the components.

The components are mounted on a supporting member 29 which, in the embodiment shown comprises a sheet metal base having a planar wall 30 acting as a rest for the fitting faces of the components. The wall 30 is confined by two lateral walls 31 bent at right angles to the first mentioned wall. The supporting member 29 is secured to a fluid manifold 34 which comprises a longitudinal conduit 35 closed at one end and connected at its other end to a pressure fluid source by a pipe 36. The conduit 35 is provided with a plurality of branches 37 adapted to be connected with the inlet fittings 7 of the various components 1. In order that such connection may be possible, the planar wall 30 of the supporting element 29 is formed with transverse rows of openings 32 (FIG. 2) adapted to receive the fittings 6 and 7 of the various components 1.

Figures 7, 14:
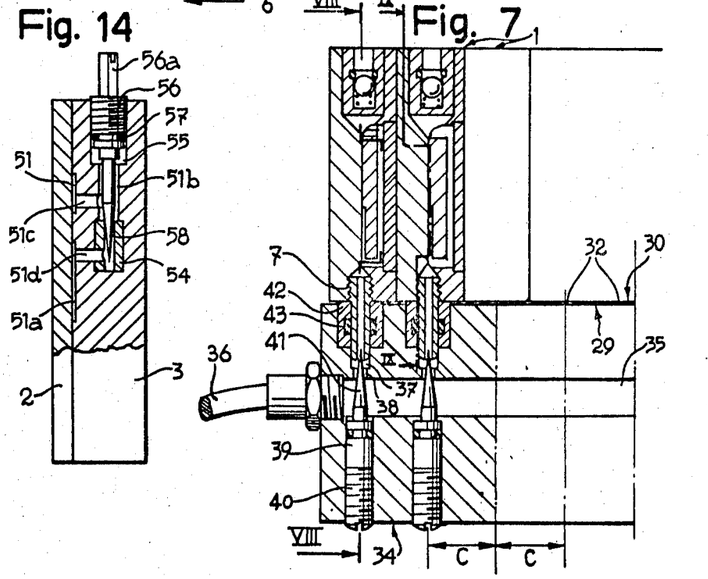
FIG. 7 is a longitudinal sectional view of the system taken along line VII—VII of FIG. 1.
FIG. 14 is a sectional view taken along line XIV—XIV of FIG. 13.
Figure 8:
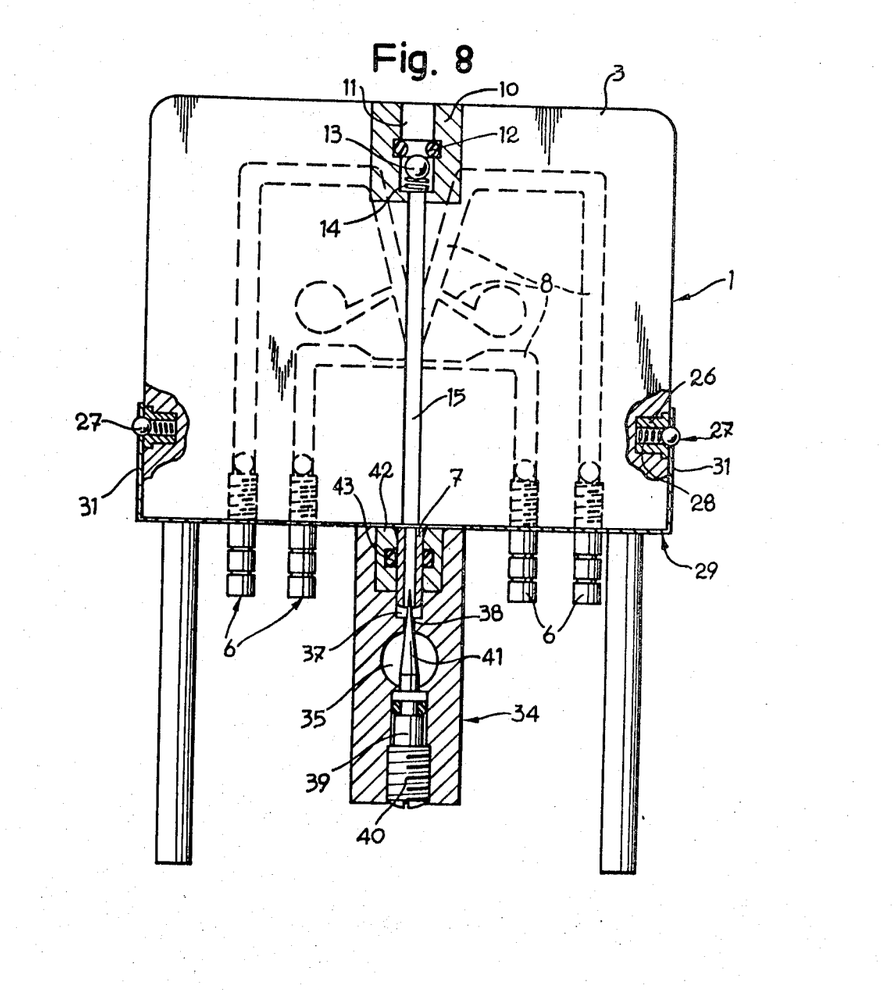
FIG. 8 is a cross-sectional view taken along line VIII—VIII of FIG. 7.

The spacing of two consecutive rows of openings 32, denoted by A in FIG. 2, is substantially the same as (or in any case not less than) the thickness B of the components. This provision permits arrangement of the components closely side by side on the supporting member 29. As shown in FIGS. 7 and 8, the distributor-divider or manifold 34 extends throughout the length of the supporting member and is arranged substantially at the midline thereof.

The branches 37 of the manifold conduit 35 are so oriented as to be arranged along the axes of the central fittings 7 on the components. The fittings 7 are thus automatically connected into the branches 37 on assembly of the components 1 in the support 29. Each branch 37 is formed with a restriction 38 which co-operates with a conical valve member 41 having an adjusting element 39. The elements 39 are each formed with a screw-threaded portion 40 which is screwed into the body of the manifold 34, so as to permit adjustment of the supply pressure of each individual component from zero to a maximum value.

This arrangement is best understood by reference to FIGS. 1 and 7. As may be seen from the latter figure, a bushing 42 is arranged in the manifold portion adjacent the support 29 at the location of each branch 37. The axial bore of each bushing receives the central fitting 7 of a component and is provided with a seal 43 by which the said component may be sealingly connected with the longitudinal conduit 35. Consequently, each component 1 can be fitted on the support 29 by driving its fittings through their associated row of openings 32. By this method of assembly the central fitting 7 is automatically fitted into its respective seating in the bushing 42, and there is thereby established connection of the inner circuit of each fitted component with the manifold conduit 35. As indicated above this connection is adjustable by means of the needle member 41 which is operable from the outside by means of its screw-threaded shank 40. As will be evident, in addition to supplying the feed pressure to each component, the manifold 34 assists in anchoring the component by the axial fit on the central fitting 7 of the component into the bushing 42.

Attachment of each component to the support is completed by snap-acting means shown clearly in FIG. 8 comprising two bushings 26 secured to the two lateral faces of each component. Each bushing will be seen to carry a ball 27 biased by a spring 28 and adapted to snap, on assembly, into an associated opening 33 formed in the sidewall 31 of the support.

FIGS. 3, 4, 5 and 6 show a preferred embodiment of modular fluid component, each of the components comprised in the system being formed from two superposed plates 2, 3, interconnected in any desired manner. One such plate 3 is formed, on its coupling face 3a, with engravings 8 which constitute the amplifier circuits and both the coupling faces are additionally formed with a plurality of recesses 4, 5 which receive the fluid inlet and outlet fittings 6, 7. The recesses 4, 5 open to the exterior through one of the sidewall faces of the component, this face being hereinafter referred to as the lower side-wall face.

The two lateral or side-wall faces disposed at right angles to the lower face are each formed with one of two further pairs of recesses 24, 25 which receive the previously referred-to bushings 26 which carry the retaining balls 27.

At the upper side wall face, that is to say the wall face remote from the fluid inlet and outlet fittings, the plates 2, 3 are formed respectively with two further semi-cylindrical recesses 9, 10 which receive, on assembly, a bushing 10. The axial bore 11 of such a bushing 10 encloses a valve ball 13 biased by a spring 14 which normally keeps the ball in its closing position by urging it against a sealing ring 12. This arrangement is best seen from FIG. 6.

The recess 11 in the bushing 10 is connected with the central fluid inlet fitting 7 by a vertical passage 15 formed in a recessed portion 16 provided on the plate 3 in the face thereof opposite the engraved face 3a. The said passage 15 connects via two through-holes 17, 18, respectively, with the bushing 10 and nipple 7. The bushing 10 acts to establish connection of the component with pressure measuring means, whereby the pressure at which each element is fed can be read and adjustment effected by the needle member 41 as necessary.

A cover plate 19 is provided for the recess 16 in the plate 3.

Figures 3, 4, 5, 6:
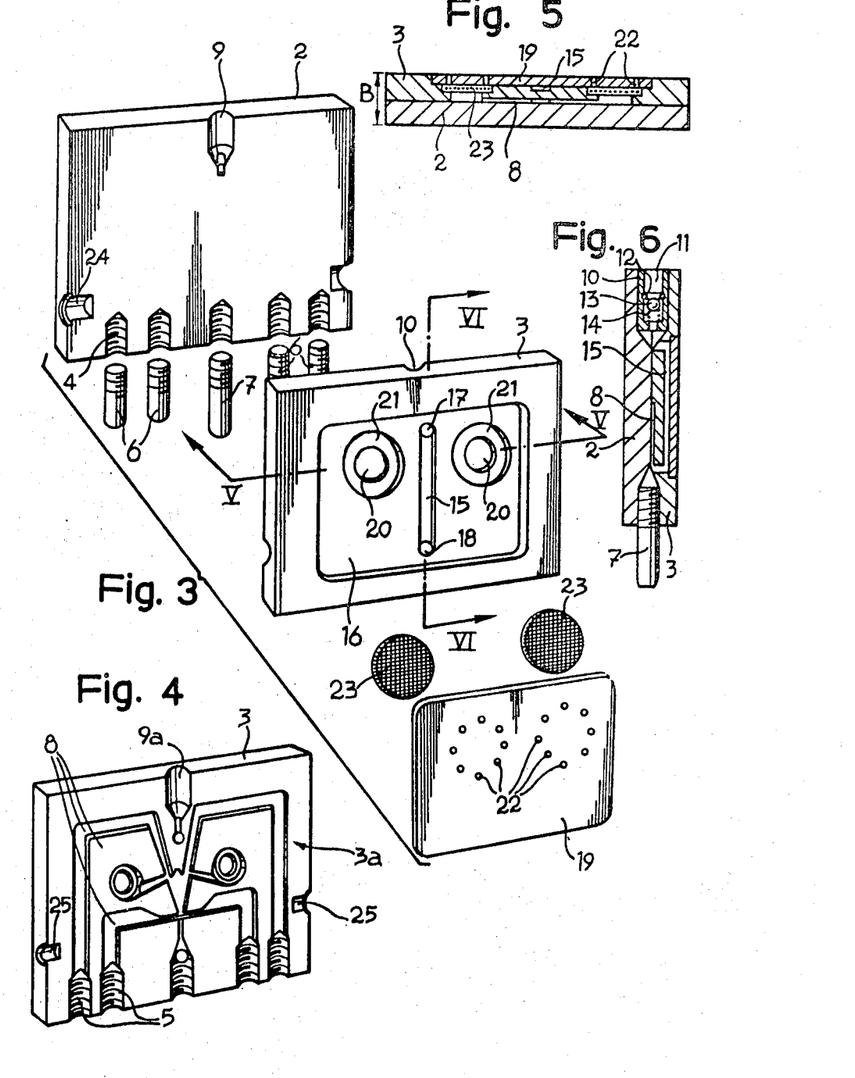
FIG. 3 is an exploded perspective view of a fluid amplifier modular component.
FIG. 4 is a perspective view showing the engraved face of one of a pair of elements forming the components shown in FIG. 3.
FIGS. 5 and 6 are sectional views taken along the lines V—V and VI—VI, respectively, of FIG. 3.

Reference to FIGS. 3, 4 and 8 will permit an understanding of the particular construction of the modular component which provides a flip-flop amplifier. Such a component includes two openings 20 around which annular recesses 21 are formed in the recessed or stepped-back portion 16 of the plate 3. The openings 20 are closed by the cover 19 which is provided with vents 22 and two wire gauze discs 23 are interposed between the cover 19 and the recesses 21 in order to suppress swirling of the outlet air. This prevents the creation of noise by the discharge of air from the component.

Figure 9:
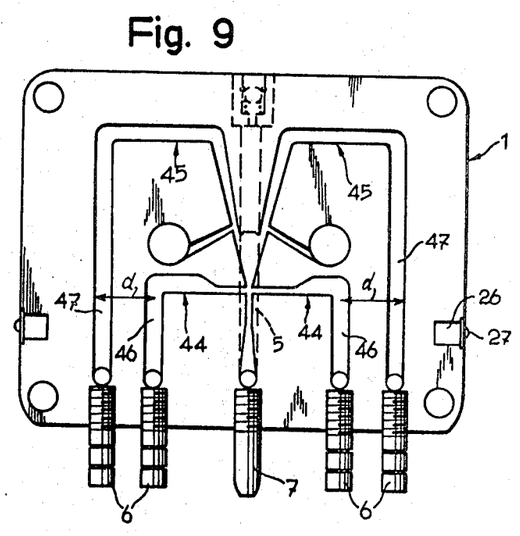
FIG. 9 is a part cross-sectional view taken along line IX—IX of FIG. 7.

FIG. 9 also shows by way of example and with differing detail a flip-flop fluid amplifier of a digital type, which can be utilized in the system described above. With this object in view fluid inlet and outlet conduits 44, 45 are extended downwardly by channels 46, 47 arranged with a constant mutual distance $d$ and connected to the side fittings 6. The fluid conduits of FIG. 9 may also be seen in broken lines in FIG. 8 wherein they are generally denoted 8. Such illustration permits the overall construction of the component to be shown without the presence of undue detailing either of FIG. 8 or 9.

Figure 10:
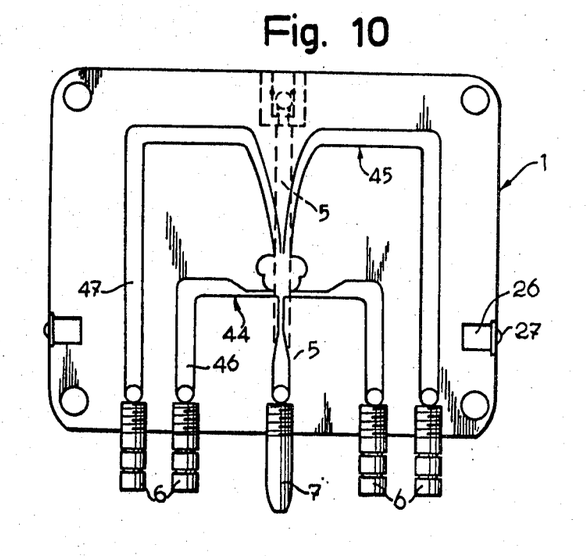
FIG. 10 is a cross-sectional view of a component comprising a proportional fluid amplifier.

FIG. 10 shows, by way of example, a proportional fluid amplifier of the analog type adapted for assembly on a modular system.

Figure 11:
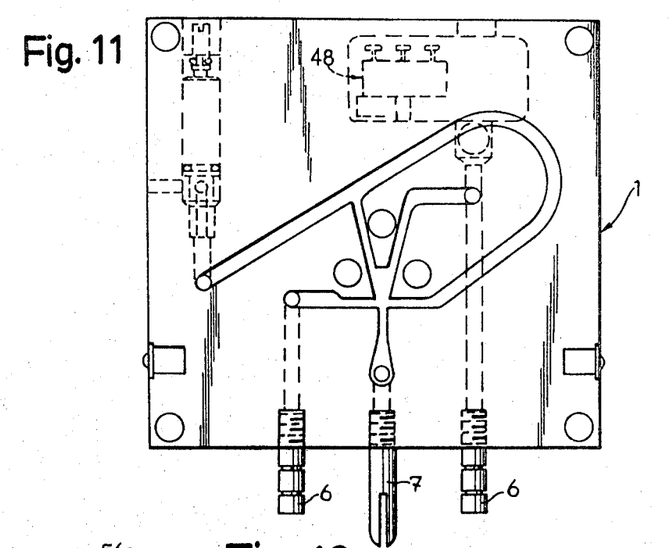
FIG. 11 is a cross-sectional view of a component comprising a monostable fluid amplifier with adjustable negative feedback.

FIG. 11 shows a further preferred embodiment of a modular analog component comprising a monostable amplifier with adjustable positive feedback, provided with an electric output arrangement 48.

Figure 12:
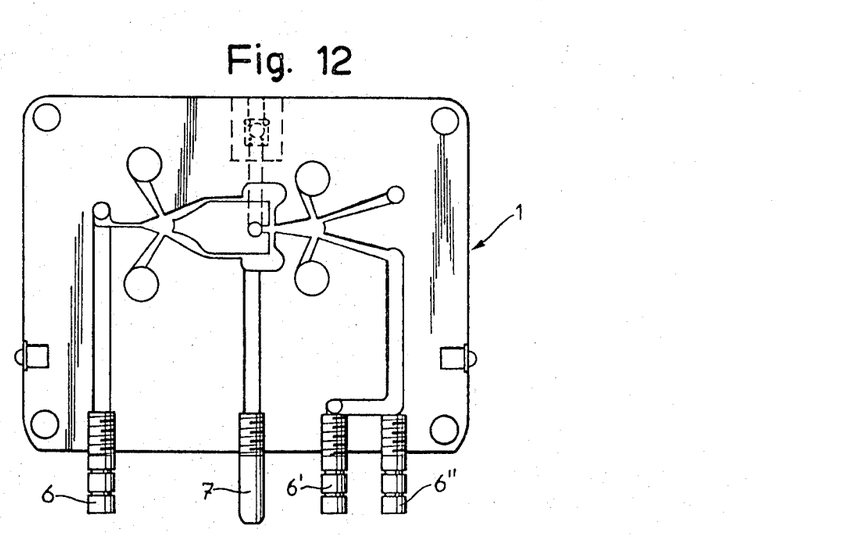
FIG. 12 is a cross-sectional view of a component providing a binary fluid counter.

FIG. 12 shows a fluid component comprising a binary counter, in which the central supply fitting 7 functions as the means for quick attachment to the manifold, and one of the side fittings 6 is utilized as an inlet for the binary counter. Two further side nipples 6' and 6", situated on the other side with respect to the central fitting, act as the outlets.

Figure 13:
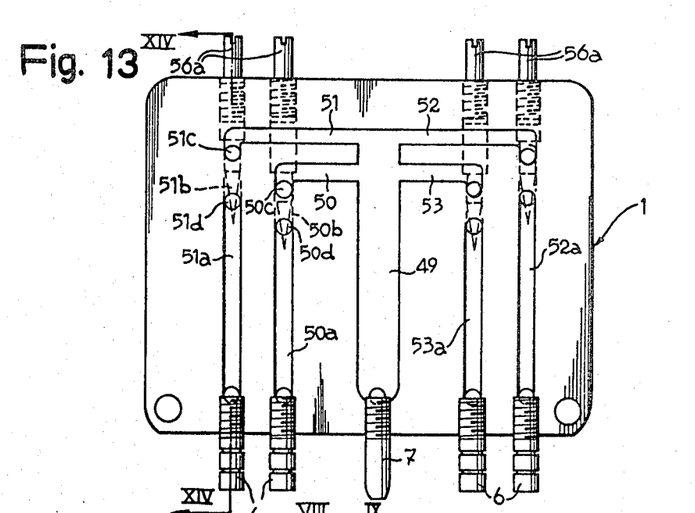
FIG. 13 is a cross-sectional view of a modular circuit component adapted to provide recordable bias.

Generally, in fluid circuits comprising logical or digital and analog components it is at times desirable to bias the components by means of a constant pressure external source, and this is conventionally effected by means of ordinary pressure reducers. FIG. 13 shows a modular component having this feature. The central feed fitting opens into a chamber 49 from which branches 50, 51, 52 and 53 extend and the said branches are connected respectively to the outlet conduits 50a, 51a, 52a and 53a by means of respective intermediate conduit sections 50b, 51b, 52b and 53b (not all of which are illustrated). The intermediate sections are provided with pressure reducers interposed therein.

As shown in FIG. 14, which is a sectional view through one of the intermediate conduits, each branch, such as 51, connects through a cross-hole 51c, with a conduit 51b situated in a plane parallel with the engravings. The conduit 51b connects through a further cross-hole 51d with the outlet conduit 51a. A bushing 54 of hard material is arranged in the auxiliary conduit 51b and connects with the cross outlet hole 51d, the top portion of the auxiliary conduit 51b being formed with an enlargement 55 in which a valve member 56 is provided. The latter has a screw-threaded portion which is received in a suitable threaded recess in the plate and is provided with a sealing ring 57 which prevents any fluid leakage through the threaded connection. The valve member 56 is provided with a stem including a conical portion 58 cooperating with the bore of the bushing 54 so as to adjustably throttle the latter and thereby control the fluid delivery through the bushing. The valve member 56 has an end portion 56a projecting outwardly from the plate. This end portion can be adjusted by means of a crew-driver or similar tool such adjustment effecting variation of the control of the flow through the bushing 54, as it will effectively vary the resistance to the fluid flow. Such variation will thus serve to adjust the pressure in the outlet conduit in the desired manner. In practice all four outlet conduits of the component are adjusted in a similar manner for the purpose of varying the pressure therein.

Figure 15:
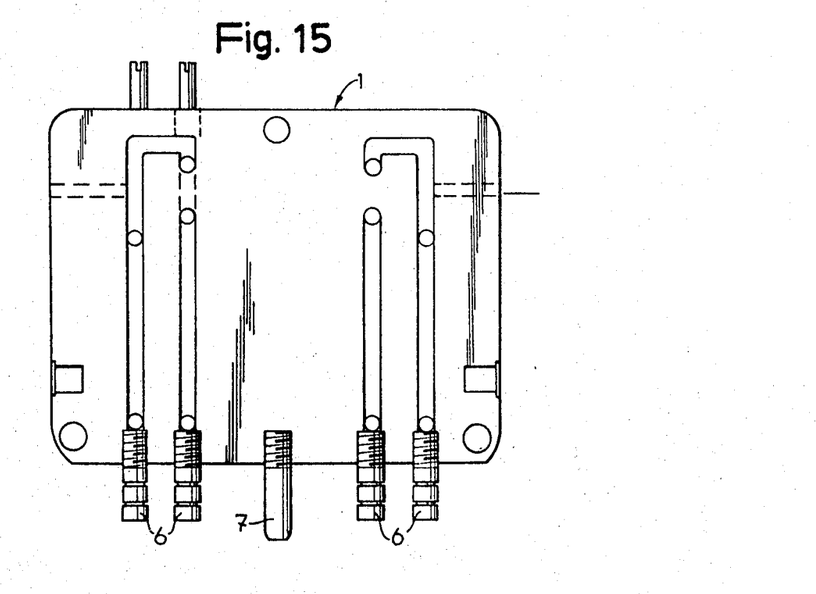
FIG. 15 is a cross-sectional view of a passive component adapted to equip the fluid system with resistors and pressure dividers.

FIG. 15 shows a modular fluid component adapted to provide the system with bias and pressure dividers capable of suitable adjustment, the component belonging to the class of passive components, inasmuch as it has no direct supply. With passive components the central fitting 7 is not utilized in the inner circuit of the component and merely acts as a mechanical support.

Figure 16:
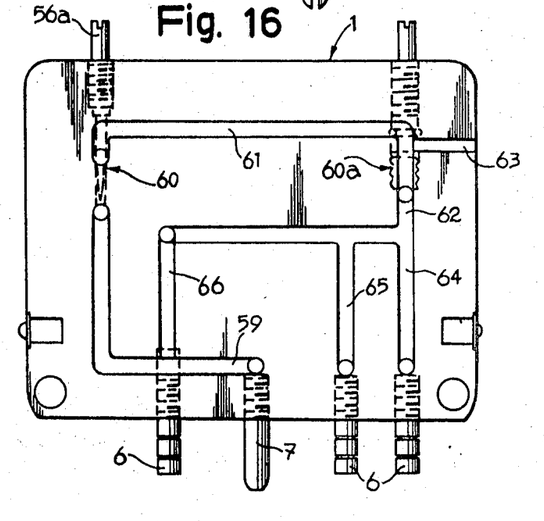
FIG. 16 is a cross-sectional view of a component which may be used as a circuit for pneumatic dimensional comparison.

In the use of fluid systems in the field of either manual or automatic workpiece-size control, one or a plurality of pneumatic circuits may be employed for size comparison. FIG. 16 shows a modular component in which the feed fitting 7 connects with a main conduit 59 having a variable throttle valve 60 therein, similar to that described in connection with the embodiment shown in FIGS. 13 and 14, and adapted to act as a variable amplification valve for a comparison circuit of conventional type. A branched conduit 61 is arranged after the throttle valve 60 and is formed with a further adjustable throttle 60a which is utilized as a variable drain and performs functions equivalent to these of the zeroizing valve in conventional circuits. To this end, the conical needle in the adjustable throttle 60a permits continuous control of the cross sectional area of fluid flow from a conduit 62, in order to discharge the fluid to the outside through an outlet conduit 63. Three branches extend after the drain valve 60a, namely, a conduit 64 connected through one outlet fitting with the measuring nozzle, a conduit 65 which may be connected with the pressure gauge indicator and a conduit 66 which may be utilized for transmitting to the other components the variation in pressure proportional to the measured size variation, which is established throughout the circuit after the drain valve. More particularly, the conduit 66 may be connected with the inlets of adjustable positive feedback fluid relays, which may be utilized as pneumatic electric transducers for the measuring signal.

From the foregoing descriptive passages it will be evident that if the outer surface of the central fitting 7 of each component and the wall of the recess receiving it, are machined, there will be afforded an easy plugging-in and removal of the components into the support as well as a tight seal following insertion or plugging-in. After the component has been fitted with its fitting 7 into the manifold, the side fittings 6 on the component project through further of the openings 32 in the supporting element. In this way the component can be connected with a suitable utilizing device.

In its assembled state, a modular arrangement according to the invention has the side fittings of its components aligned on both sides of the manifold. This affords a maximum compactness of the construction, interconnection of the various components being easily effected by means of conventional flexible pipes.

Furthermore, the modular system provided allows easy and quick replacement of any of its components without modification of the connections of the remaining circuits. Moreover, the various components can be fed from a single manifold with pressures independently adjustable at will.

The general system as described above with particular reference to various exemplary components can be formed, not only with such modular components of constant thickness, but also with units themselves incorporating a plurality of such components and built in the form of structures the thickness of which is a multiple of the predetermined unit component value.

It should moreover be borne in mind that in fluid circuits variable bias, variable adjusting valves and the like are necessary or desirable. To this end all the controls for such devices are generally arranged on the top of the modular components to which they relate, and this makes operation of the said controls more practical. However, this does not of course influence the fact that with special circuit requirements the adjusting valves can be arranged anywhere in the circuit.

To meet industrial requirements, the modular components forming the fluid systems according to the invention can be assembled on supporting members that are attached to suitable panels.

Figure 17:
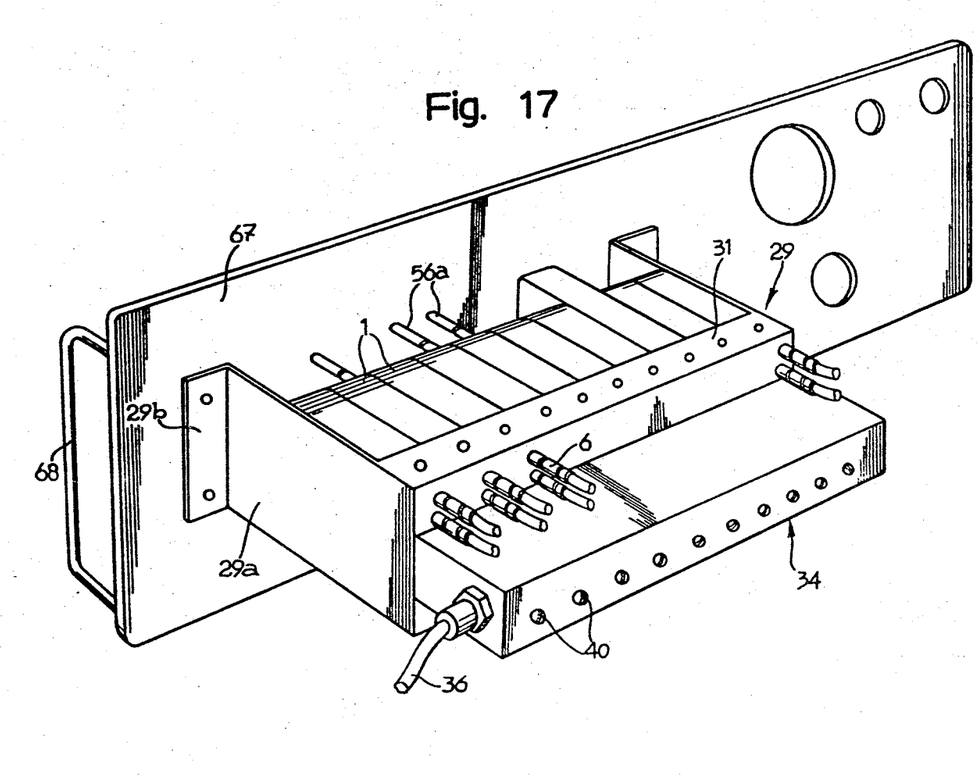
FIG. 17 is a perspective view of the system according to the invention when mounted on a supporting panel.

As shown in FIG. 17, such a supporting member 29 has its end walls 29a bent out to form two bearing wings 29b for assembly of the member on a panel 67 provided with handgrips 68. The supporting member is secured by means of screws to the said panel and the latter formed with openings for adjustment of the screw threaded elements 56a which protrude from the side wall faces of the components opposite to the side wall faces carrying the fittings.

What we claim is:

1. A fluid amplifier system comprising: a plurality of planar shaped modular components each including a fluid amplifier with fluid inlet and outlet fittings; an elongated supporting member for the said components; retaining means for releasably holding each component in an assembled condition with respect to the said support; said supporting member including an elongated fluid manifold and; means on the said manifold for adjusting fluid flow therein; the said manifold incorporating a fluid conduit and being provided at region along its length with branches adapted to receive and secure at least one of said fittings of said components on assembly thereof on the supporting member so as to establish a fluid connection between the conduit and at least some of the components, said branches having means supporting said modular components.

2. A system as claimed in claim 1 wherein each amplifier has all its fluid inlet and outlet fittings projecting from one side wall of the component box, the said fittings having their axes extending parallel to one another and situated in a common plane parallel with the major faces of the said components and spaced therefrom by a distance constant for all the components, means on the said components for indicating the pressure at which they are fed, connected at one end with a pressure fluid source, adjustment of the fluid flow in the said manifold controlling the fluid pressure feed to the said components.

3. A system as claimed in claim 2 wherein the said conduit of the fluid pressure manifold extends throughout the length of the supporting element and is provided with the said branches along its length in the region of each set of transverse openings.

4. A system as claimed in claim 3 wherein the said branches are each adapted to engage and sealingly connect with one of the said fittings when received by an adjacent opening, merely on assembly of the component in the support.

5. A system as claimed in claim 4 wherein the said fittings connecting with the manifold branches are centrally disposed in their respective side walls.

6. A system as claimed in claim 5 wherein the manifold is provided at each branch with a bushing arranged coaxially with the branch and formed with an axial recess adapted to receive a central feed fitting of its respective fluid component, the said bushing being provided with a radial seal adapted to engage the feed fitting.

7. A system as claimed in claim 2 wherein the means for indicating the pressure at which each component is fed includes a bushing situated on the side wall of the component remote from the housing the fittings, the said bushing being adapted to be connected with pressure gauge means and having its axial bore closed by a ball valve member biased by a spring which normally holds it in its closed position against a seal, the said opening connecting through an inner conduit with a feed nipple to afford a reading of the pressure at which the component is fed.

8. A system as claimed in claim 1 wherein the elongated supporting member includes a planar wall which acts as a supporting surface for the fitting side walls of the components and which is provided with a transverse row of openings for receiving the fittings of the individual components when they are assembled in the said support.

9. A system as claimed in claim 1 wherein the pressure feed is adjustable between a zero and a maximum value.

10. A system as claimed in claim 1 wherein the means for adjusting the fluid flow from the manifold to at least several of the components includes, in association with each branch of the main conduit a restriction interposed in the branch and an adjusting member formed with a screw-threaded shank screwed into the manifold body, the said adjusting member carrying a needle valve member adapted to cooperate with the restriction to throttle the cross sectional area thereof even to total interception.

11. A system as claimed in claim 1 wherein a plurality of said fluid amplifier components each include two superposed plates fixedly interconnected, one plate having engraved therein recesses constituting the amplifier circuit and the other plate acting as a cover for said recesses, the coupling faces of the said plates being formed with pair of recesses into which the fluid inlet and outlet fittings are received, further pairs of recesses for carrying parts of the said retaining means and still further pairs of recesses for carrying parts of the said measuring means.

12. A system as claimed in claim 1 wherein the said fluid amplifier components comprise at least one of the following:
 (A) flip-flop amplifiers of a logic type;
 (B) proportional amplifiers of an analogic type;
 (C) amplifiers with adjustable positive feed back;
 (D) passive components without feed having adjustable resistances and drains;
 (E) components adapted to provide an adjustable bias;
 (F) components adapted to provide dimensional measuring circuits.

13. A system as claimed in claim 12 wherein the passive fluid component includes a connecting fitting, which is not utilized for feed purposes and acts as a mechanical fitting and connection element for the component on the support and manifold.

14. A fluid amplifier system comprising: a plurality of planar shaped modular components each including a fluid amplifier with fluid inlet and outlet fittings; an elongated supporting member for the said components; retaining means for releasably holding each component in an assembled condition with respect to the said support; said supporting member including an elongated fluid manifold; and means on the said manifold for adjusting fluid flow therein; the said manifold incorporating a fluid conduit and being provided at regions along its length with branches adapted to receive and secure at least one of said fittings of said components on assembly thereof on the supporting member so as to establish a fluid connection between the conduit and at least some of the components, the retaining means adapted to hold each component with respect to the supporting element in the assembled condition comprising two balls biased by springs and arranged one on each of two lateral walls of each fluid component, the said balls being adapted to engage in holes formed in two sidewalls of the supporting element.

15. A system as claimed in claim 14 wherein the supporting element comprises a sheet metal plate provided with sidewalls forming together with the planar wall an elongated body of U-shaped cross section, said planar wall having formed therein the rows of openings for receiving the fluid amplifier components and said sidewalls having formed therein the holes adapted to receive the retaining balls.

16. A fluid amplifier system comprising: a plurality of planar shaped modular components each including a fluid amplifier with fluid inlet and outlet fittings; an elongated supporting member for the said components; retaining means for releasably holding each component in an assembled condition with respect to the said support; said supporting member including an elongated fluid manifold; and means on the said manifold for adjusting fluid flow therein; the said manifold incorporating a fluid conduit conduit and being provided at regions along its length with branches adapted to receive and secure at least one of said fittings of said components on assembly thereof on the supporting member so as to establish a fluid connection between the conduit and at least some of the components, a plurality of said fluid amplifier components each including two superposed plates fixedly interconnected, one plate having engraved therein recesses constituting the amplifier circuit and the other plate acting as a cover for said recesses, the coupling faces of the said plates being formed with pair of recesses into which the fluid inlet and outlet fittings are received, further pairs of recesses for carrying parts of the said retaining means and still further pairs of recesses for carrying parts of the said measuring means, including a conduit connecting the recess in the bushing adapted to act as a tap for the pressure gauge means, with the inlet fitting, said conduit being situated in a plane parallel to the plane of the engraved recesses and is formed in a stepped-back surface carried by the engraved plate, the stepped-back portion being overlaid by a cover closing the said conduit, which latter connects with the recess in the bushing and inlet fitting through transverse holes.

17. A fluid amplifier system comprising: a plurality of planar shaped modular components each including a fluid amplifier with fluid inlet and outlet fittings; an elongated supporting member for the said components; retaining means for releasably holding each component in an assembled condition with respect to the said support; said supporting member including an elongated fluid manifold; and means on the said manifold for adjusting fluid flow therein; the same manifold incorporating a fluid conduit and being provided at regions along its length with branches adapted to receive and secure at least one of said fittings of said components on assembly thereof on the supporting member so as to establish a fluid connection between the conduit and at least some of the components, a plurality of said fluid amplifier components each including two superposed plates fixedly interconnected, one plate having engraved therein recesses constituting the amplifier circuit and the other plate acting as a cover for said recesses, the coupling faces of the said plates being formed with pair of recesses into which the fluid inlet and outlet fittings are received, further pairs of recesses for carrying parts of the said retaining means and still further pairs of recesses for carrying parts of the said measuring means, including a conduit connecting the recess in the bushing adapted to act as a tap for the pressure gauge means, with the inlet fitting, said conduit being situated in a plane parallel to the plane of the engraved recesses and is formed in a stepped-back surface carried by the engraved plate, the stepped-back portion being overlaid by a cover closing the said conduit, which latter connects with the recess in the bushing and inlet fitting through transverse holes, at least some of the fluid components being provided with vents, the latter comprising holes bored in the stepped-back portion of the engraved plate, the said holes connecting with the outside through a plurality of drain holes formed in the cover which is fitted to the plate, wire gauze elements being interposed between the cover and drain holes to suppress swirling of the discharged fluid from the conduit to the outside.

18. A fluid amplifier system comprising: an elongated supporting and interconnected manifold member, a plurality of generally planar fluidic components adapted to be releasably connected to said support and manifold member, each of said components having one of its smaller side faces as mounting surfaces so that the major planes of the components extend generally perpendicular to the support and manifold member, a plurality of fluid fitting means, one of said fluidic components or said supporting and manifold member having said fitting means thereon, a plurality of fitting receiving means in the other of said fluidic components or said supporting and manifold member, said receiving means and fitting means being constructed to provide both at least one fluid interconnection between the fluidic components and the supporting and manifold member and support for fluidic components on the supporting and manifold member.

19. A fluid amplifier system as defined in claim 18, wherein said supporting and manifold member has a fluid supply passage extending longitudinally therethrough, branch passages in said member communicating with said supply passage and adapted to communicate through said fittings with the fluidic components, valve means in at least a plurality of said branch passages for independently controlling the supply pressure to at least several of the fluidic components.

20. A fluid amplifier system as defined in claim 19, wherein the several fluidic components that have individually controlled supply pressure include port means on the side of the fluidic component opposite the mounting surface thereof adapted to receive a pressure sensing device whereby the supply pressure may be maintained.

21. A fluid amplifier system comprising: an elongated supporting and manifold member, a plurality of generally planar fluidic components adapted to be releasably connected to said support and manifold member, each of said components having one of its smaller side faces as mounting surfaces so that the major planes of the components extend generally perpendicular to the support and manifold member, a plurality of fluid fitting means, one of said fluidic components or said supporting and manifold member, said supporting and manifold member including channel shaped means and sides closely flanking the sides of the fluidic components extending outwardly from the supporting and manifold member, releasable coupling means on each of the fluidic components and the channel sides permitting the removal and replacement of any of the fluidic components without removing the other fluidic components.

22. A fluid amplifier system as defined in claim 21, wherein said releasable coupling means includes a resiliently biased detent on each side of each fluidic component and a recess in the channel side corresponding to each detent.

References Cited
UNITED STATES PATENTS

| | | | |
|---|---|---|---|
| 3,076,473 | 2/1963 | Wadey | 137—81.5 XR |
| 3,191,008 | 6/1965 | Wadey | 235—201 XR |
| 3,194,533 | 7/1965 | McLay | 251—122 |
| 3,226,530 | 12/1965 | Greenblott et al. | 137—81.5 XR |
| 3,250,470 | 5/1966 | Grubb | 235—201 |
| 3,285,283 | 11/1966 | Calvin | 137—614.03 |
| 3,305,171 | 2/1967 | Phillips et al. | 235—201 |
| 3,306,538 | 2/1967 | McCracken | 235—201 |
| 3,368,576 | 2/1968 | Crissey | 137—608 XR |

SAMUEL SCOTT, Primary Examiner

U.S. Cl. X.R.

137—608